United States Patent
Nucci et al.

(10) Patent No.: US 7,649,853 B1
(45) Date of Patent: Jan. 19, 2010

(54) METHOD FOR KEEPING AND SEARCHING NETWORK HISTORY FOR CORRECTIVE AND PREVENTIVE MEASURES

(75) Inventors: Antonio Nucci, Burlingame, CA (US); Yihua Wu, Edison, NJ (US)

(73) Assignee: Narus, Inc., Sunnyvale, CA (US)

( * ) Notice: Subject to any disclaimer, the term of this patent is extended or adjusted under 35 U.S.C. 154(b) by 416 days.

(21) Appl. No.: 11/656,721

(22) Filed: Jan. 22, 2007

(51) Int. Cl.
 *H04L 12/28* (2006.01)
(52) U.S. Cl. .................... 370/254; 370/252; 370/255; 709/223; 709/224; 709/225
(58) Field of Classification Search ................ 370/229, 370/238–240, 230, 251, 235, 252, 254, 325; 709/238–242, 223, 224
 See application file for complete search history.

(56) References Cited

U.S. PATENT DOCUMENTS 7,353,294 B1 *  4/2008  Nucci et al. ................. 709/241
2004/0083092 A1 *  4/2004  Valles ............................ 704/9
2005/0091237 A1 *  4/2005  Bakalash et al. ............. 707/100
2007/0180311 A1 *  8/2007  Harvey et al. ................ 714/13

* cited by examiner

*Primary Examiner*—Pankaj Kumar
*Assistant Examiner*—Anez Ebrahim
(74) *Attorney, Agent, or Firm*—Fernandez & Associates, LLP (57) ABSTRACT

A method is provided for identifying an event of network activity associated with a network where the network includes a plurality of interfaces and the method includes providing a first data structure comprising a node, partitioning the plurality of interfaces into a plurality of groups, associating the plurality of groups with the node, providing a vector corresponding to a group of the plurality of groups for representing a summary of the network activity, and identifying an event of network activity according to the vector. Experimental results are shown to demonstrate the effectiveness and robustness of the invention.

24 Claims, 8 Drawing Sheets

METHOD FOR KEEPING AND SEARCHING NETWORK HISTORY FOR CORRECTIVE AND PREVENTIVE MEASURES

BACKGROUND

1. Field

The present invention relates to computers and computer networks. More particularly, the present invention relates to keeping and searching network history for corrective and preventive measures.

2. Description of Related Art

Many events happen in networks, such as an IP network at all times. Techniques in the prior art for network event detection is based on the independent signals, for example, a network event may be detected by comparing current levels of independent signals to a threshold. Network events such as attacks, anomalies, and/or overloads may be identified based on catastrophic impact, customer call-in, etc., or they may be discovered by chance. Put together over time, network managers may develop a fairly extensive list of network event profiles, from a history of the network activity, they have identified as being anomalies, attacks, overloads or other events. In the prior art, network operation specialists, such as a network manager, use this experience in history of network activity accumulated from the past to address network problems in a manual fashion. The manual process may be tedious, inaccurate, and not effective. Accordingly, an automated method for keeping and searching network history for corrective and preventive measures is desirable.

SUMMARY OF THE INVENTION

In general, in one aspect, the present invention involves a method for identifying an event of network activity associated with a network comprising a plurality of interfaces. The method includes providing a first data structure comprising a node, partitioning the plurality of interfaces into a plurality of groups, associating the plurality of groups with the node, providing a vector corresponding to a group of the plurality of groups for representing a summary of the network activity, and identifying an event of network activity according to the vector. Optionally, the method further includes defining a super state of the network based on a first sub-vector of the vector, and calculating a distance of the first sub-vector to a second sub-vector of the vector, the second sub-vector being associated with a known event, wherein identifying the event of network activity includes comparing the distance to a threshold, and identifying the super state as the known event according to the comparison. Optionally, the method further includes searching for the vector by traversing the first data structure. Preferably, the network includes a plurality sets of attributes, the first data structure includes a lattice having an axis corresponding to a hierarchical scale comprising a set of attributes of the plurality sets of attributes, the node includes a lattice point having a coordinate, the coordinate includes an attribute of the set of attributes, the plurality of interfaces is partitioned into the plurality of groups according to a second data structure representing the hierarchical scale, and the plurality of groups is associated with the node according to the coordinate. Preferably, the second data structure is a hierarchical data structure and includes a third data structure corresponding to the hierarchical scale, the third data structure includes a fourth data structure corresponding to the attribute of the set of attributes comprised in the hierarchical scale, the fourth data structure includes a fifth data structure corresponding to an attribute value of the attribute, and the fifth data structure includes a pointer referencing a sixth data structure corresponding to another attribute of the set of attributes included in the hierarchical scale, and the plurality of interfaces is partitioned into the plurality of groups according to a Cartesian product of the coordinate. Preferably, the hierarchical scale includes at least one selected from the group consisting of a temporal scale including a hierarchy of time intervals, a topological scale including a hierarchy of topologies, and a categorical scale including a hierarchy of categories. Optionally, the method further includes defining the known event according to a history of the network activity, where the hierarchical scale includes a temporal scale including a hierarchy of time intervals, and the vector includes a time series of network measurements.

In general, in one aspect, the present invention involves a computer readable medium embodying instructions executable by the computer to perform method steps for classifying a network traffic flow. The instructions includes functionality to provide a first data structure including a node, partition the plurality of interfaces into a plurality of groups, associate the plurality of groups with the node, provide a vector corresponding to a group of the plurality of groups for representing a summary of the network activity; and identify an event of network activity according to the vector.

BRIEF DESCRIPTION OF DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the present invention may admit to other equally effective embodiments.

DETAILED DESCRIPTIONS OF THE INVENTION

Cumulative states of a network may be maintained in memory via logs, such as Simple Network Management Protocol (SNMP) log, Border Gateway Protocol (BGP) log, or other suitable data logs of network activity. A super state may be defined from such cumulative states for keeping and searching network history for corrective and preventive measures. For example if super state S of the current time is similar to super state T corresponding to a time in the past when there was a identified network event such as anomalies, attacks, overloads or other events, then the super state S may indicate a similar network event at the current time which may require corrective actions. The network event corresponding to the super state T may have been identified subsequent to the occurrence of the network event using techniques and/or tools known in the prior art. In another example, if the super state T corresponds to a time in the past prior to the identified network event, then the super state S, being similar to the super state T, may portend (i.e., indicate a precursor of) a similar event at the current time which may require preventive measures. Efficacy of the method described above may depend on a suitable definition of super state and an effective algorithm to quickly search for a time in the past where the corresponding super state T is similar to the super state S at the current time. As an example, the super state may be defined using SNMP logs. SNMP log may be periodically polled from various interfaces in the network. For example, inbound as well as outbound traffic may be polled at both endpoints of each link in the network. In one example, the polling measurement may be a traffic volume (e.g., the number of data bytes "nbytes") aggregated for each link per time interval without regard to other parameters of the data such as the source and/or destination IP addresses, type of traffic, etc. In other examples, the polling measurement may be configured differently. In some examples, the polling measurement at a time "t" and an interface with the interface ID "ifaceID" may be represented by the schema TRAFFIC(t, ifaceID, nbytes), where a traffic volume may be periodically polled from the interface in a fixed time interval, e.g., 5 minutes, as is typically performed in large ISP backbones. Unlike the prior art where network state typically relates to polling measurement performed at each individual interface independently and at a fixed time interval (e.g., 5 minutes, 1 day, etc), super state may be defined differently according to aspects of the present invention for the following reasons:

Network events may occur according to time windows that do not correspond to either 5 minutes or 1 day period. Therefore the super state may be defined to search for events at multiple temporal scales;

Network events may not be visible in any of the individual interfaces but visible in a correlated group of interfaces. For example, one of the interfaces failing may not be an event while all outgoing interfaces from a device failing together may be an event. Therefore the super state may be defined to search for events at multiple topological scales; and Network events may not be visible in any of the individual interfaces but visible in a group of interfaces that belong to a specific category, such as OC-48, OC-96, or other categories. Therefore the super state may be defined to search for all events at multiple categorical scales.

What is important here, according to aspects of the present invention, is that these scales, such as temporal scales, topological scales, categorical scales, or other scales, may be modeled as being hierarchical scales. For example, all units on any such scale may form a hierarchy such that any two units have a hierarchical relationship, i.e., a parent/child relationship where one is contained in the other. Each unit of any such scale may be referred to as an attribute of the hierarchy. For example, a topological scale may include units, or attributes, such as interface, router, sub-network, or entire network. In another example, some hierarchical scales may be defined as follows. Topological scale including units of "interface", "router", and "ALL" (i.e., entire network) where interface ⊂ router ⊂ ALL; the units of "interface", "router", and "ALL" are referred to as attributes forming a topology hierarchy;

Categorical scale including units of "interface", "link speed class" (e.g. OC-48, OC-96, etc.), and "ALL" (i.e., entire network) where interface ⊂ link speed class ⊂ ALL; the units of "interface", "link speed class", and "ALL" are referred to as attributes forming a category hierarchy; and Temporal scale including units of "5 min", "hour", "day", "ALL" (i.e., entire time till infinity) where 5 min ⊂ hour ⊂ day ⊂ ALL; the units of "5 min", "hour", "day", "ALL" are referred to as attributes forming a time hierarchy.

There may be considerable flexibility in defining these hierarchal scales, both within each of the hierarchal scales (e.g., "sub-network" may be added to the Topological scale, "night time within a day" may be added to the Temporal scale, etc.) and in adding additional hierarchal scales (e.g., "city", "state", or other geographic location type may form an additional hierarchal scale). In other examples, BGP logs or other suitable log of network activity may also be used in defining the super state and the hierarchical scales in addition to, or instead of, SNMP logs.

Figure 1:
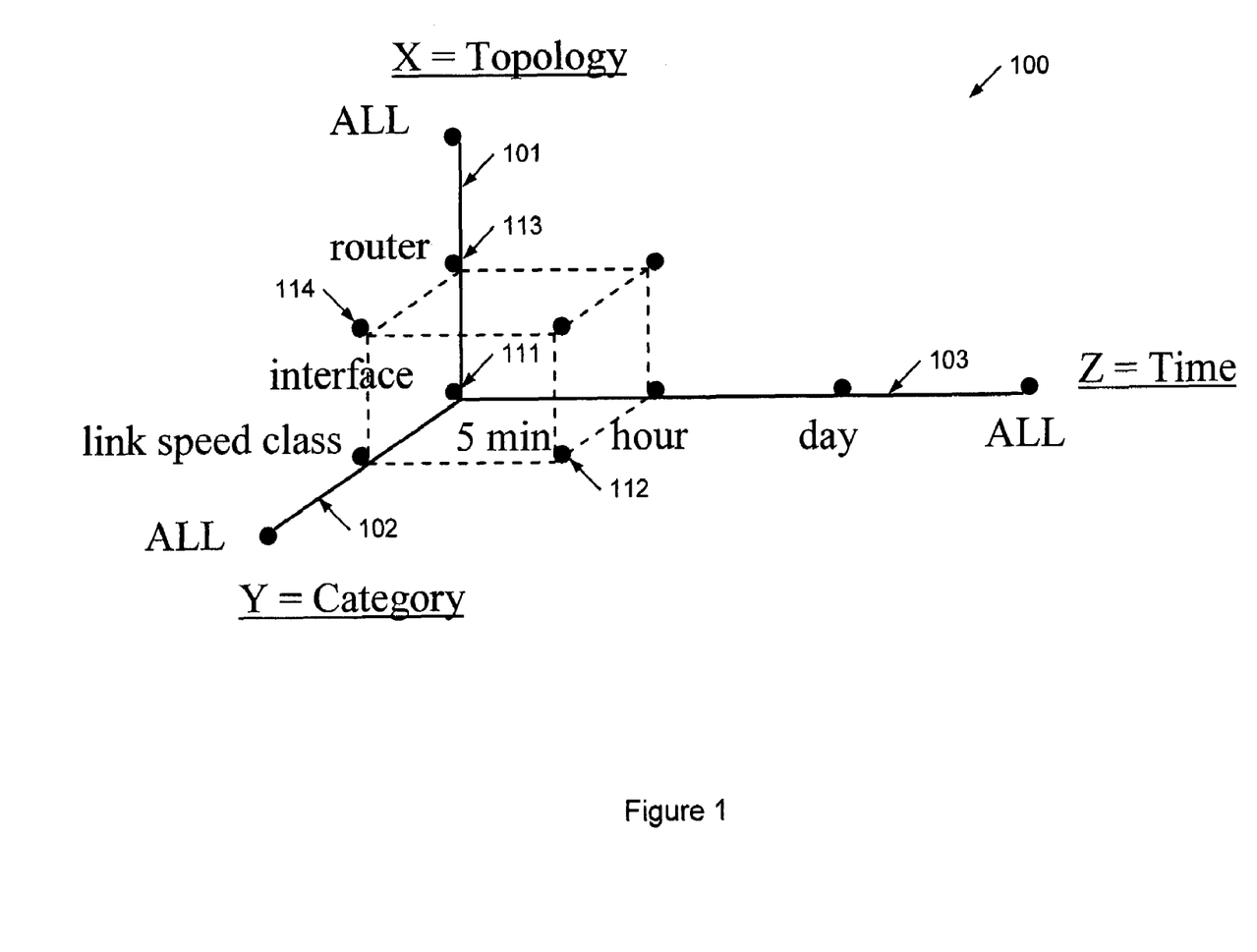
FIG. 1 shows a schematic diagram of a lattice in accordance with aspects of the present invention.

A lattice may be formed from multiple hierarchical scales as shown in FIG. 1. Here, the lattice is shown as a three dimensional space (100) where the Topological scale forms the X axis (101), Categorical scale forms the Y axis (102), and the Temporal scale forms the Z axis (103). Any point, i.e., lattice point, in this exemplary three dimensional space (100) may be represented as a coordinate. In some examples, network polling measurement may be performed according to the lattice, such as the exemplary lattice shown in FIG. 1. For example, the lattice point (111) with coordinate (interface, interface, 5 min) may represent the finest polling configuration and may be referred to as the root of the lattice. The polling measurement may be a time series of traffic volume aggregated on hourly basis. For example, the lattice point (111) may represent a polling configuration where each element of the time series may be represented as TRAFFIC(t, ifaceID, nbytes) as described above. In another example, the lattice point (114) with coordinate (interface, link speed class, hour) may represent a polling configuration where the traffic volume may be aggregated for all interfaces that belong to each link speed class during an hour interval. In some examples, network polling measurement may be performed corresponding to each lattice point in the lattice to represent cumulative states, or the super state of the network.

Figure 2:
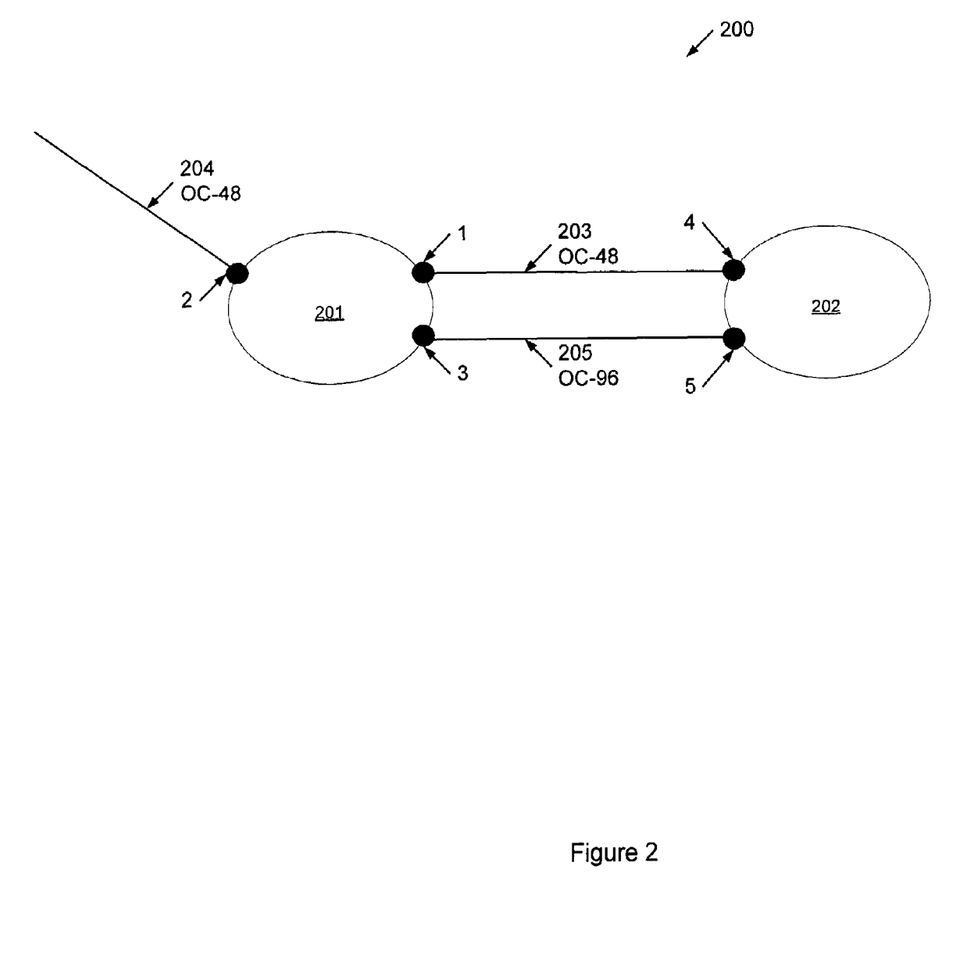
FIG. 2 shows an exemplary network in accordance with aspects of the present invention.

In some examples, the super state may be explored according to the lattice. A data structure may be defined that automates the process of super state exploration. FIG. 2 shows an exemplary network for which the super state may be explored in accordance with aspects of the present invention. As shown in FIG. 2, the exemplary network (200) includes router (201) having interfaces (1)-(3) and router (202) having interfaces (4)-(5). The link (203) connecting interface (4) and (1) has high speed capacity OC-48 (i.e., 2.4 Gbps). The link (204) connecting to interface (2) also has high speed capacity OC-48. The link (205) connecting interface (5) and (3) has high speed capacity OC-96 (i.e., 4.8 Gbps).

Figure 3:
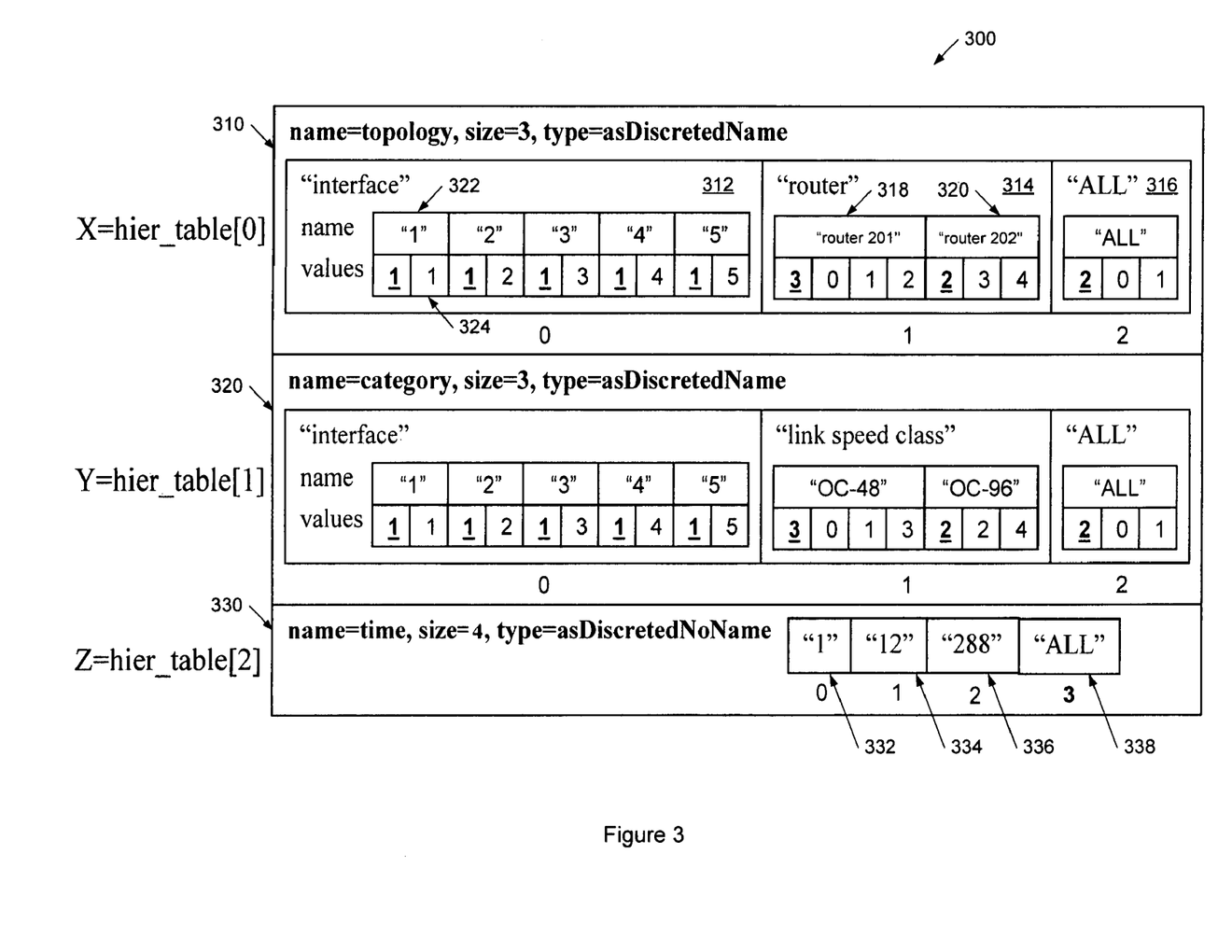
FIG. 3 shows a schematic diagram of a data structure in accordance with aspects of the present invention.

FIG. 3 shows an exemplary data structure (300) "hier_t-able" for storing the configurations information of the lattice for automating the process of super state exploration. The data structure (300) may be defined hierarchically and may include one or more sub data structure(s) at each hierarchical level, such as sub data structure (310) "hier_table[0]", sub data structure (320) "hier_table[1]", and sub data structure (330) "hier_table[2]". The sub data structures (310) through (330) may correspond to the topology hierarchy, the category hierarchy, and the time hierarchy, respectively, as shown in FIG. 1 above. Moreover, for each hierarchy specified in each sub data structure of the data structure (300), a "size" field may specify how many attributes the hierarchy consists of, or how many units the hierarchical scales includes. For example, the topology hierarchy specified in sub data structure (310), indicated by "size=3", consists of three sub data structures (312), (314), and (316) corresponding to the attributes "interface", "router", and "ALL" representing the finest to the coarsest topology, or scale, relating to network data measurement. Each of these attributes may be further specified in more details by another level of sub data structures. For example, sub data structure (316), corresponding to attribute "ALL", may include a name field, which contains "ALL", and a value field, which contains "2, 0, 1". Here, "2", which may be referred to as a domain size of the attribute "ALL", indicates that there are two routers included in a child attribute "router" of the attribute "ALL" in the topology hierarchy while "0" and "1" are indexes, or pointers, for referencing the two router sub data structures (318) and (320), respectively, in the sub data structure (314). As another example, sub data structure (314), corresponding to the attribute "router", may include two router sub data structures (318) and (320), which contains name fields "router 201" and "router 202" respectively, and two corresponding value fields, which contains "3, 0, 1, 2" and "2, 3, 4". Here, domain size "3" indicates that there are three interfaces included in a child attribute of the attribute "router" associated with "router 201" in the topology hierarchy while "0", "1", and "2" are indexes, or pointers, for referencing three interface sub data structures representing interfaces "1", "2", and "3" respectively in the sub data structure (312). For example, "0" references the interface sub data structure (322) which represents interface "1". In addition, domain size "2" indicates that there are two interfaces included in a child attribute of the attribute "router" associated with "router 202" in the topology hierarchy while "3" and "4" are indexes, or pointers, for referencing two interface sub data structures representing interfaces "4" and "5" respectively in the sub data structure (312). In another example, the topology hierarchy specified in sub data structure (320) may be defined in a similar fashion.

In general, the sub data structures may be defined using various schemes indicated by the "type", such as "type=asDiscredtedName" in sub data structures (310) and (320), or "type=asDiscretedNoName" in sub data structure (330) in the exemplary data structure shown in FIG. 3. For example, "type=asDiscredtedName" may indicate that a parent attribute may be defined based on its child in the hierarchy. In particular, the number of distinct attribute values, i.e., names associated with each attribute, of a child attribute may define an attribute domain size for the parent (e.g., "2" for "ALL", "3" for "router 201", "2" for "router 202", etc, in sub data structure (310)); corresponding child details may be specified by entries beneath names of each parent, in a data structure with schema of (nEntries, index$_1$, ..., index$_{nEntries}$). Here, nEntries may indicate the number of indices for referencing details of a child attribute while each index$_i$ may contain a pointer for referencing specific details relating to each distinct attribute value of the child attribute. For example, sub data structure (314) specifies an attribute "router" along the topological scale with two routers, i.e., "router 201" and "router 202, and two value fields, i.e., (nEntries=3, index$_1$=0, index$_2$=1, index$_3$=2) and (nEntries=2 index$_1$=3 and index$_2$=4). In another example, for attribute at the lowest level in the hierarchy, index$_i$ may specify information directly, e.g., the attribute value, instead of containing a pointer. For example, for attribute "interface", index contained in value field (324) of the interface sub data structure (322) specifies "interface 1" directly, instead of another index or pointer. In some examples, the sub data structures may be defined differently based on different "type" designation. For example with the Temporal hierarchical scale, designated as "type=asDiscreteNoName", the sub data structure (330) "hier_table[2]" includes a table specifying time interval, or window size, for network traffic measurement. In the example shown in FIG. 3, the table includes an entry (332) corresponding to a 1-bin window size where a bin is a 5 minutes time interval; an entry (334) corresponding to a 12-bins window size, or 12*5=60 minutes (1 hour) time interval; an entry (336) corresponding to a 288-bins window size, or 288*5=1440 minutes (1 day) time interval; and an entry (338) corresponding to "ALL" window sizes, i.e., all 5 minutes, 1 hour, and 1 day time intervals. Although the examples described above uses specific data structures, such as a hierarchical data structure or a table, for storing configuration information of the lattice, one skilled in the art will appreciate that other data structures, such as an array, record, hash table, file, tree, graph, linked list, descriptor, data base, or any suitable data structure may also be used.

As an example, network traffic measurement information may be stored, or organized, according to the lattice (100) as shown in FIG. 1 and the data structure (300) as shown in FIG. 3 to represent cumulative states, or the super state of the network, such as the network (200) shown in FIG. 2. Specifically, a collection of network traffic measurement may be associated with each lattice point, such as the lattice point (111)-(114) as shown in FIG. 1. For example, a pointer (not shown) may be stored in a sub data structure representing a lattice point to reference the collection of network traffic measurement. As another example, the collection of network traffic measurement may be stored in the sub data structure representing the lattice point directly.

Figure 4:
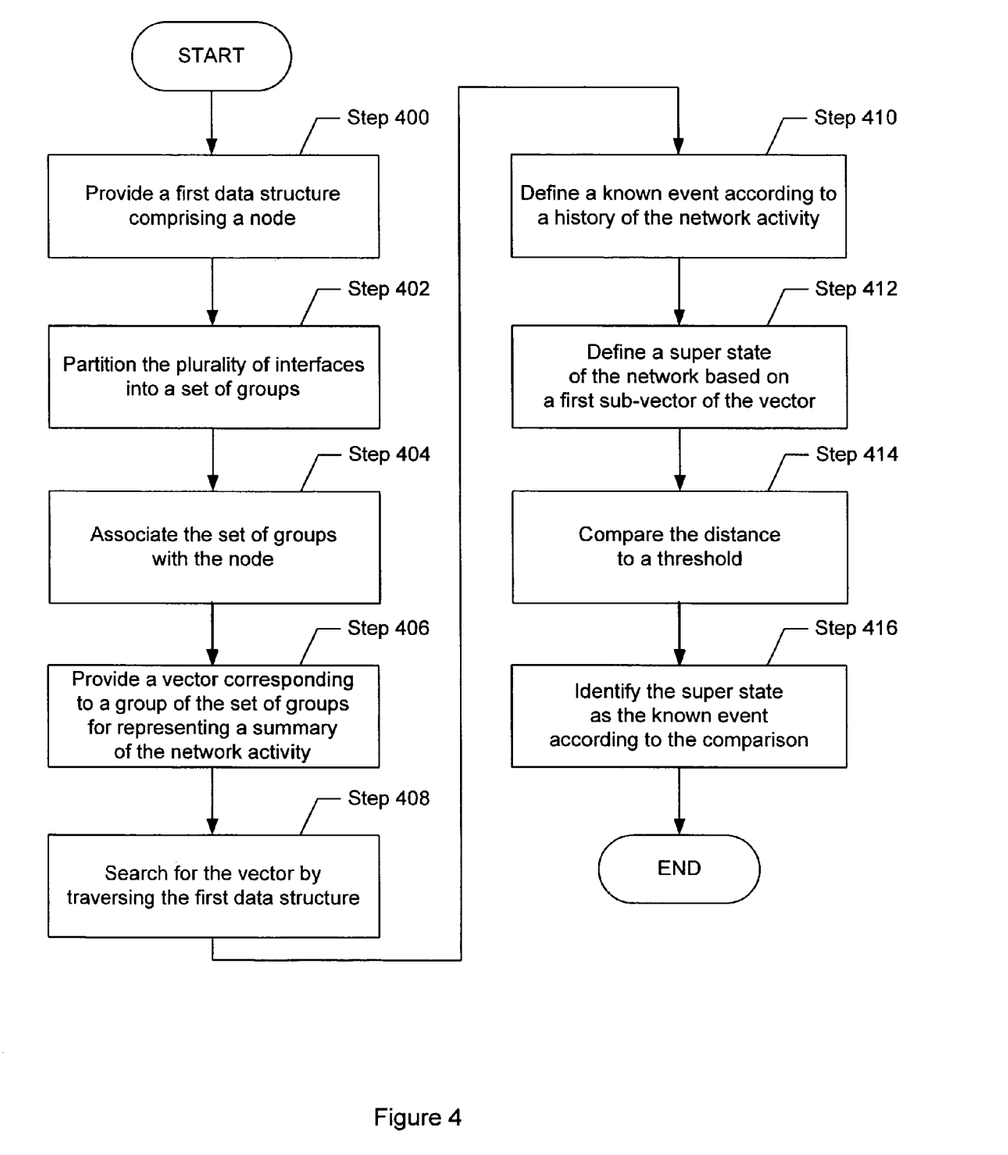
FIG. 4 shows a flow chart of a method in accordance with aspects of the present invention.

FIG. 4 shows a flow chart of a method in accordance with aspects of the present invention. Initially, a first data structure comprising a node, such as the lattice (100) comprising a lattice point (111), (112), (113), or (114) as shown in FIG. 1 above, is provided in step (400) to represent a network, such as the network (200) as shown in FIG. 2 above. A plurality of interfaces, such as the interfaces (1)-(5) may be partitioned into a set of groups in step (402). Step (404) associates the set of groups with the node, such as the lattice point (111), (112), (113), or (114). Further, step (406) provides a vector corresponding to a group of the set of groups for representing a summary of the network activity. In one example, the network traffic measurement information may be partitioned and associated with a lattice point, or coordinate, of the lattice (100). For example, the lattice point (113) of the lattice (100) has a coordinate (router, interface, 5 min) and may be associated with a lattice dictionary, denoted as "lattice[router, interface, 5 min].D" which may include network activity (e.g., cumulative data volume) captured as a time series at 5 minutes intervals. Here, the interfaces (1)-(5) may be partitioned and assigned to the lattice point (11) based on a Cartesian product of the coordinate (router, interface, 5 min). For example, the attribute "router" may correspond to a domain {router 201, router 202} and the attribute "interface" may be represented as a domain {interface 1, interface 2, interface 3, interface 4, interface 5}. In one example, all the interfaces in the exemplary network (200) may be partitioned into a plurality of groups (e.g., {interface 1, interface 2, interface 3} and {interface 4, interface 5}) by applying the Cartesian product to group interfaces according to the router it associates with. In other examples, the partition may be different based on different ways to apply the Cartesian product. In one example, the dictionary "lattice[router, interface, 5 min].D" may include a collection of time series "lattice[router, interface, 5 min].D[k]" where the time series with k=1 corresponds to data volume for the group {interface 1, interface 2, interface 3} and the time series with k=2 corresponds to data volume for the group {interface 4, interface 5} each captured at 5 minutes intervals. More over, for each group, the time series may be represented as a vector. Additional network activity captured at each incremental time interval may be appended as additional element to the vector. In general, each of the vector "lattice[i,j,t].D[k]" has variable cardinality which increases as time progresses.

In another example, the point (114) of the lattice (100) has a coordinate (router, link speed class, 5 min) and may be associated with a lattice dictionary, denoted as "lattice[router, link speed class, 5 min].D" which may include cumulative data volume captured as a time series at 5 minutes intervals for each router-link speed class pair. In the exemplary network 200 as shown in FIG. 2, the router-link speed class pair include (router 201, OC-48) corresponding to {interface 1, interface 2}, (router 201, OC-96) corresponding to {interface 3}, (router 202, OC-48) corresponding to {interface 4}, and (router 202, OC-96) corresponding to {interface 5}. Therefore, in this example, the lattice dictionary "lattice[router, link speed class, 5 min].D" may include a collection of vectors each corresponding to an interface grouping of yet another partition of all interfaces, such as the partition {{interface 1, interface 2}, {interface 3}, {interface 4}, {interface 5}}. For each router-link speed class pair corresponding to an interface grouping, the time series may be represented as a vector identified by an unique domain index k where all possible domain indices form a partition domain corresponding to the partition. In general, each lattice point with coordinate (i, j, t) may represent a partition of all interface IDs where network activity measurement may be organized as a collection of vectors, each denoted as "lattice[i,j,t].D[k]" where k is a domain index from the partition domain corresponding to the lattice point.

In still another example, the root of the lattice (100), i.e., the lattice point (111), has a coordinate (interface, interface, 5 min) and may be associated with a lattice dictionary, denoted as "lattice[interface, interface, 5 min].D". The interfaces may be partitioned as {{interface 1}, {interface 2}, {interface 3}, {interface 4}, {interface 5}}.

In general, the lattice dictionary may be updated in one plane of the lattice with a fixed time granularity, such as 5 min. The update may then propagate plane by plane along the temporal scale, such as 5 min, hour, ALL in the exemplary lattice 100 as shown in FIG. 1. For example, for any attribute pairs i and j, each lattice dictionary "lattice[i,j,0].D" may be updated once per 5 minutes. In another example, each lattice dictionary "lattice[i,j,1].D" may be updated once per hour, by aggregating the latest 12 traffic volume values from "lattice[i,j,0].D". In still another example, the lattice dictionary "lattice[i,j,2].D" may be updated once per day, by aggregating the latest 24 traffic volume values from "lattice[i,j,1].D". This is referred to as landmark window model. The lattice dictionary may also be updated using sliding window models whereby network traffic may be aggregated according to in-memory hier_table[i] within one plane of the lattice with a fixed time granularity. Although the examples above describes network activity measurement using such simple statistics as the total traffic volume per time interval, one skilled in the art will appreciate the invention may be practiced with other variations of network activity measurement scheme.

Continuing with the discussion of Figure, a vector may be searched by traversing the first data structure, such as the lattice (100) as shown in FIG. 1 above, in step (408). A known event may be defined according to a history of the network activity in step (410). A super state of the network may be defined based on a first sub-vector of the vector in step (412). The distance may be compared to a threshold in step (414). The super state may be identified as the known event according to the comparison in step (416). For example, as described above, each of the vector "lattice[i,j,t].D[k]" has variable cardinality which increases as time progresses. In some examples, a super state may be defined based on a time period $\Delta T$ starting from time T where the super state may be represented by a subset of each of the vector "lattice[i,j,t].D[k]" with a fixed cardinality corresponding to the time period. The subset of the vector "lattice[i,j,t].D[k]" may be referred to as a sub-vector denoted as "lattice[i,j,t].D[k][T]". For example, a current super state S may include a vector $v_k$ which is a sub-vector "lattice[i,j,t].D[k][c]" where "c+$\Delta T$" represents the current time. With a chosen time period $\Delta T$ and a lattice defined with a plurality of dictionaries corresponding to each lattice point, a sub-vector nearest neighbor search problem may be defined as a search for a sub-vector u=lattice[i,j,t].D[k][p] such that a distance $d(u,v_k)$ is the smallest among all sub-vectors across all lattice points (i, j, t) as the lattice is traversed, where D[k][p] is a sub-vector of D[k], of same cardinality as $v_k$, based on the same time period $\Delta T$ from some time "p" in the past. The sub-vector u may be the most similar super state from the history of network activity across all lattice points. The search may be performed for similar super state that is significantly similar, that is, the distance is bounded above by a suitable threshold. This sub-vector u may be used for diagnosis as well as prediction as described earlier.

FIGS. 5A, 5B, 6A, and 6B shows experiment results to demonstrate the methods described above. In some examples, traffic volume per unit time interval per interface may be simulated from normal distributions $N(\mu,\sigma^2)$ for control purposes of an experiment. In particular, traffic under normal conditions is generated from $P_0=N(\mu_0,\sigma^2)$; its abnormal counterpart is generated from $P_1=N(\mu_1,\sigma^2)$—both have the same variance but different means. The results of the experiment may be demonstrated from the following two aspects:

Global change event: when anomaly occurs, changes in traffic volume per interface cumulate in a correlated fashion such that aggregated traffic volume at coarser granularity along the hierarchical scales reflects changes due to the anomaly;

Local changes event: when anomaly occurs, changes in traffic volume per interface uncorrelated such that aggregated traffic volume at coarser granularity along the hierarchical scales does not reflect changes due to the anomaly.

Given two sub-vectors u and v, both of cardinality (or size) l, modeled using the normal and abnormal conditions respectively, the distance between them may be defined as $$d(u,v) = \frac{\left|\sum_{i=0}^{l-1}(u[i]-v[i])\right|}{l}.$$

With this distance function, u and v are statistically close if $d(u,v) < |\mu_1-\mu_0|/2$ In an example, network activity event relating to global changes may be modeled with an assumption that at any time, traffic volume distribution at every interface is the same. That is, distribution changes at the same time with the same amount, if any, across all interfaces. Hence, per-interface changes will not be cancelled out by change occurred at another interface when traffic volumes are aggregated and reflect a global change. In a first set of experiments, training data consists of 3 hours' traffic, with the first and the third hour per-interface traffic modeled under normal condition and generated from $P_0=N(20,\sigma^2)$, the second hour traffic modeled under abnormal condition and generated from $P_1=N(25,\sigma^2)$. This constitutes an exemplary history of the network activity. Further in the experiment, one-hour of testing data models network traffic under abnormal conditions and is also generated from $P_1=N(25,\sigma^2)$. And this constitutes an exemplary current network super state S. A query sub-vector is constructed from S, and then sub-vector nearest neighbor search is performed in lattice dictionary corresponding to each lattice point of interest. Since the second hour traffic rate increases from $P_0$ to $P_1$ at every interface, ideally, the experiment is expected to detect similar network activity pattern at every lattice point for the super state S; and to detect the starting location of the sub-vector in history most similar to the query sub-vector is the beginning of the second hour.

Figure 5A:
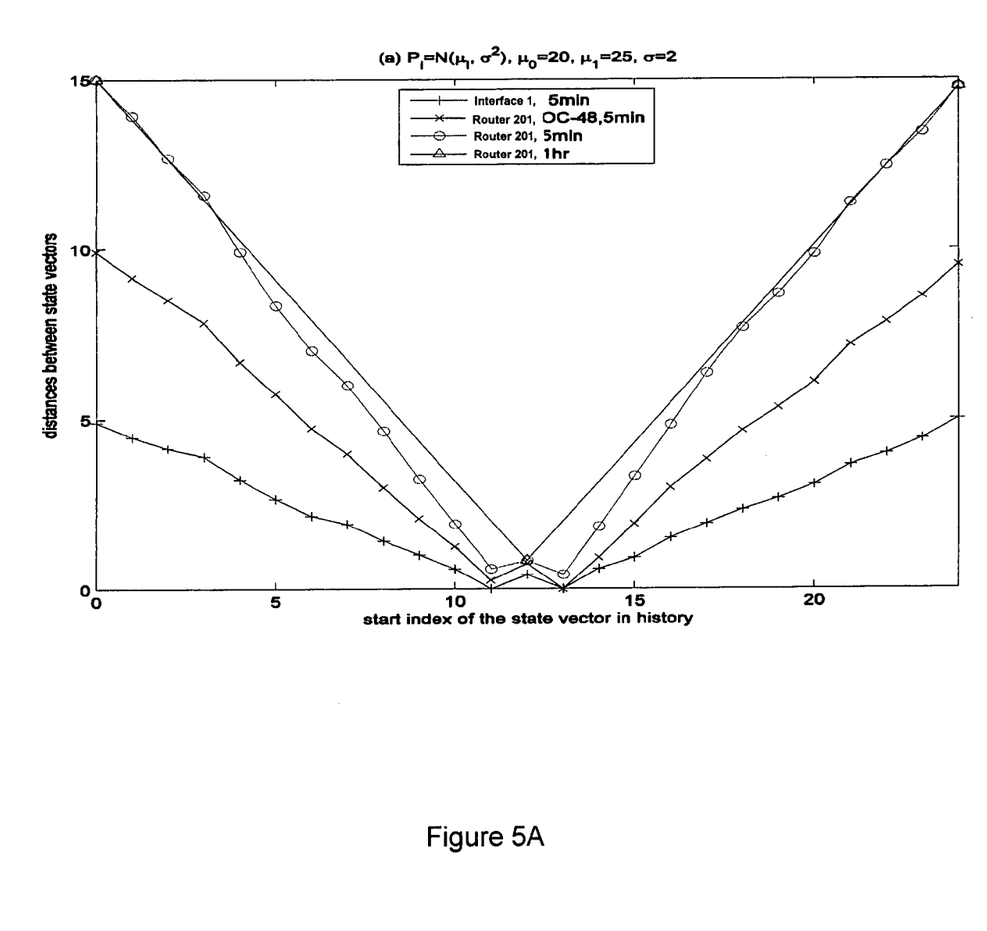
FIG. 5A, 5B show simulated results, modeling a global change event, of distances and relative errors of change point estimates between a query sub-vector and a sub-vector in history in accordance with aspects of the present invention.
Figure 5B:
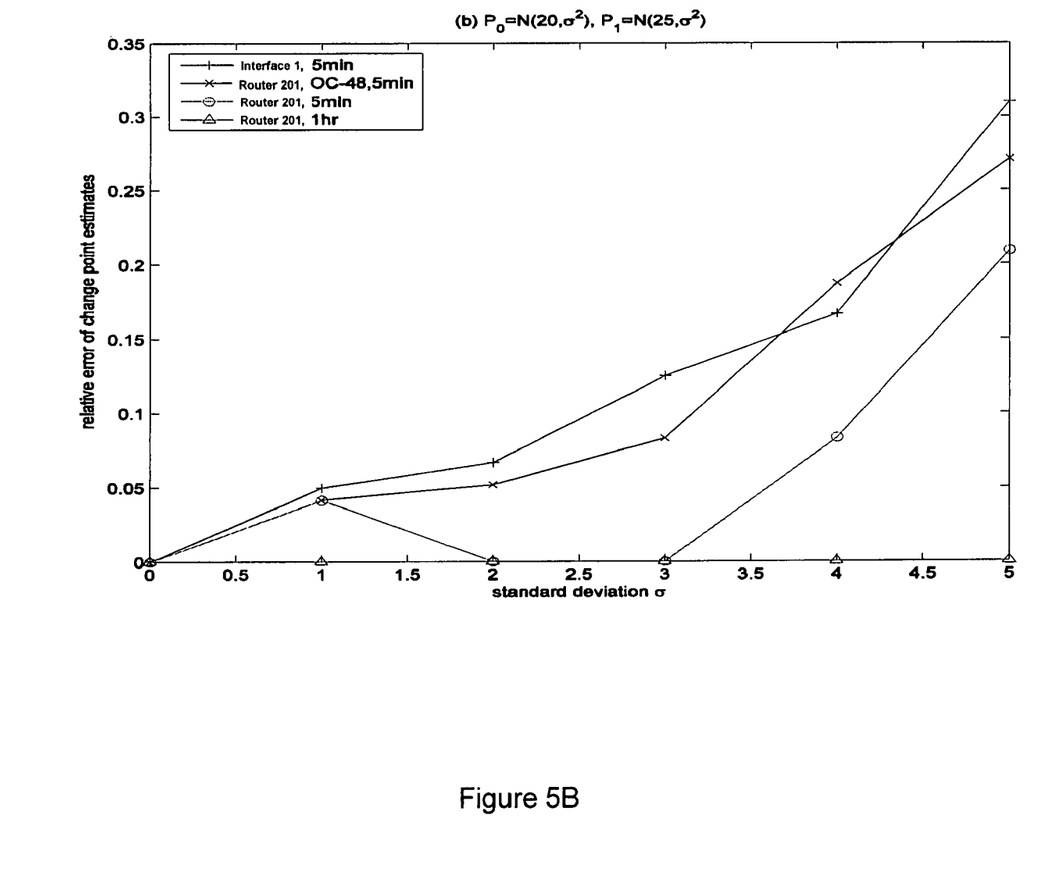

FIG. 5A show simulated results, for modeling global change event, of the distance between the query sub-vector and a sub-vector of a network super state in history at various lattice points, as a function of the start index, or time, of the sub-vector of a network super state in history, with $\sigma=2$. In this example, the current super state is found most similar to the second hour's network super states in history, as the V-shape curves show. More precisely, the smallest distance value at each lattice point (corresponding to one curve in FIG. 5A) is achieved at around x=12, the start of the second hour (each x-value corresponds to 1 unit of time-5 minutes, therefore x=12 corresponds to one hour), as expected by aspects of the invention. The start position of the sub-vector that is closest to the query sub-vector in distance may be referred to as an estimate for the change point-a point in time when an abnormal network super state begin to occur. In the example in FIG. 5A, the true change point is x=12; the change point estimates are x=11 and x=13 (from when smallest distance values achieve). The standard deviation $\sigma$ in distribution is varied from 0 to 5 in increments of 1. For each deviation value for $\sigma$, the relative error of a change point may be estimated as its absolute difference from the true counterpart, normalized by the time duration for which an abnormal super state lasts (e.g., it is 12 units of time in the example), at all lattice points. FIG. 5B shows the results from a selected set of lattice points, one for each granularity level. There is expected that relative error of a change point estimate increases with $\sigma$ increasing. It is more interesting to observe that for a given $\sigma$, such relative errors decrease as the lattice is traversed from a finer to a coarser lattice point, due to the well-known Large Number Theory in statistics. This explains a scenario when events may not be visible in any of the individual interfaces, but in correlated group of them. On the other hand, if numerous network states are returned from finer lattice points, a better strategy is to merge these fine partitions of the data with similar distribution into coarser partitions recursively.

Figure 6A:
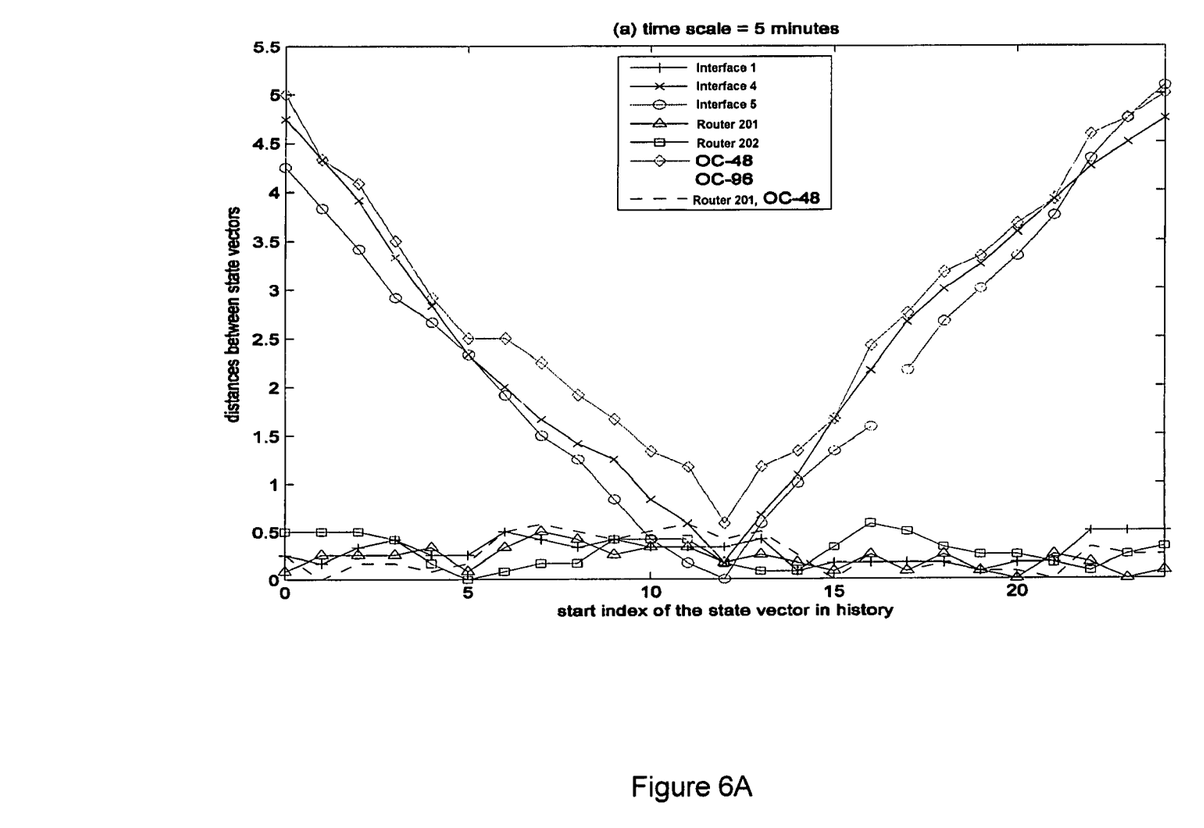
FIG. 6A, 6B show simulated results, modeling a local change event, of distances and relative errors of change point estimates between a query sub-vector and a sub-vector in history in accordance with aspects of the present invention.
Figure 6B:
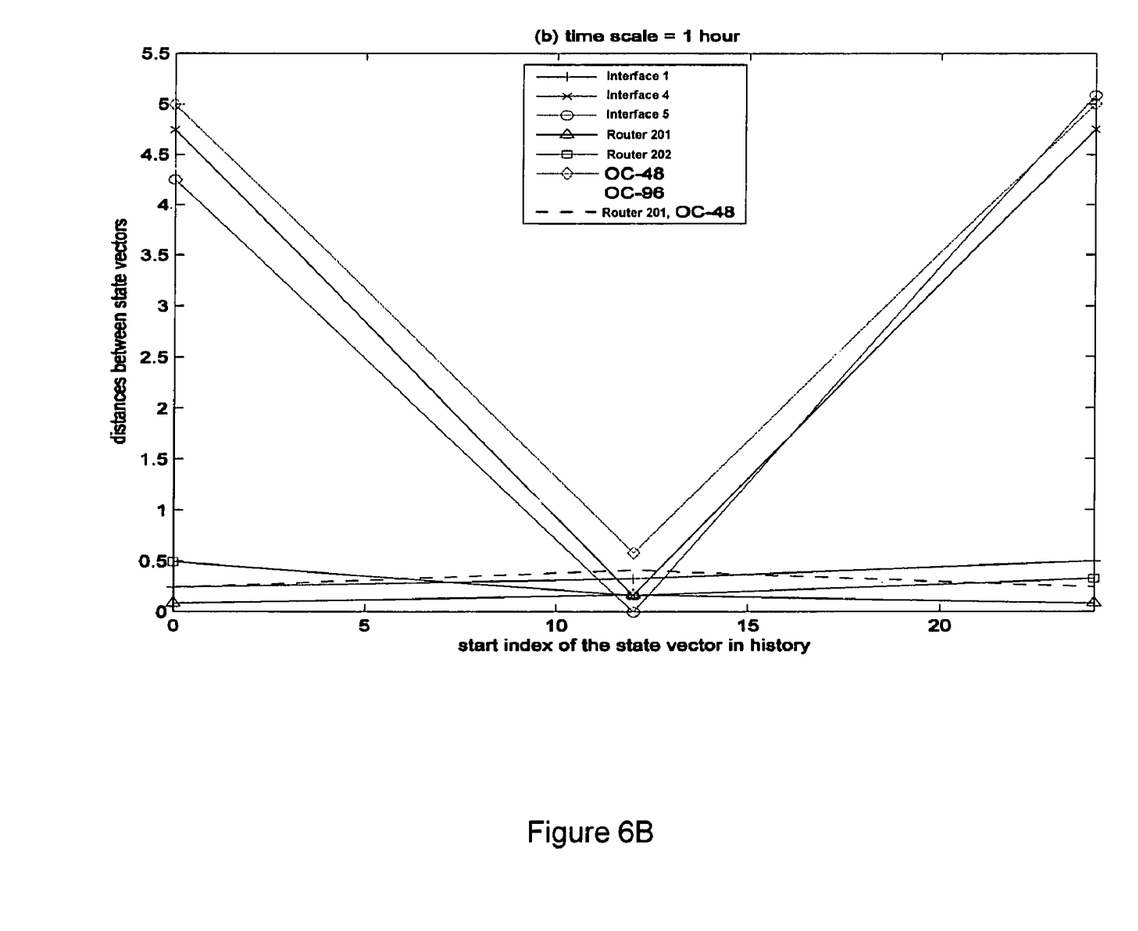

FIG. 6A show simulated results, for modeling local change event, of the distance between the query sub-vector and a sub-vector of a network super state in history at various lattice points. Again, training data consists of 3 hours' traffic, with the first and the third hour data generated under normal conditions, the second hour data containing abnormal behaviors. But different from global change event, per-interface distribution may change in an un-correlated fashion among different interfaces. For example, with the network setup as shown in FIG. 2, traffic volume distribution may be modeled to only change at interface (4) and (5) in the second hour, from $N(20,\sigma^2)$ to $N(25,\sigma^2)$ and $N(15,\sigma^2)$, respectively, while distributions at other interfaces remain unchanged. Additionally, the one-hour testing data is generated from same distributions that are used to generate the second hour training data. In FIG. 6A, from the plane of time=5 minutes, both V-shape curves and asymptotically horizontal curves may be observed from a variety of groupings of data. The former implies a change in traffic rates within that grouping, and the closest network super state is constructed from traffic received in the second hour. The latter indicates the stability of traffic rates observed from those grouping across time; no abnormal state is detected from the normal ones, as reflected by low distance values. More precisely, due to the fact that traffic rate from respective interface (4) and (5) deviates from the normal value with the same amount but in opposite directions, there is no anomaly detected at router (202) where the grouping of the two interfaces cancels off changes at individual interfaces. When the time scale is traversed to the plane of time=1 hour as shown in FIG. 6B, the same trend is observed, since current network super states are constructed from one-hour traffic.

Although the methods described above have been described for SNMP logs, the same method extends to other data logs or combination thereof. For example, consider Border Gateway Protocol (BGP) logs. Dynamic routing in the global Internet is currently performed by the BGP. BGP routing information carries a sequence of AS numbers, indicating the path a route has traversed. Routing information is exchanged between the two BGP routers through UPDATE messages. Incremental updates are sent as network information changes. The stability of BGP affects the stability, availability, and efficiency of the Internet. It is thus of great importance to understand the behavior of BGP. Similar to network super states constructed from SNMP logs, BGP-update dynamics may be summarized using multi-dimensional, quantified features. Besides the IP prefix in BGP updates and the time classes, statistics for each prefix may be considered as follows:

BGP update rate: number of updates sent by a router for a single prefix within a time interval.

Average inter-arrival time of BGP updates: measures the average inter-arrival time of BGP update messages sent by a router for a single prefix within a time interval. This is devised to detect BGP update burst.

Number of AS paths: BGP will suffer slow convergence problem due to link failure or router crash. During convergence process, BGP router may receive a number of potential AS paths that are seldom seen in the past. Therefore, the number of AS paths in that period indicates routing stability.

AS path occurrence frequency: According to the observation that only a small number of different AS paths are announced under normal traffic conditions, the frequency of each (predefined) frequently occurred AS path is monitored. Moreover, the sum frequency of all other AS path occurrences may be calculated. Each frequency is considered as a separate measure. The frequency of frequently occurred AS path is expected to be high, in contrast to the desired low frequency of remaining AS paths.

AS path difference: measures the difference between the current AS path with the common used AS path. Each AS path is defined as a string in which each character is an AS number. And the difference is calculated by the edit distance of two strings. If more than one AS path is observed inside an interval, the average of the AS path differences is returned.

Although the examples above describe the first data structure using a lattice formed from multiple hierarchical scales to represent the network, one skilled in the art will appreciate that other data structures, such as an array, record, hash table, file, tree, graph, linked list, descriptor, data base, or any suitable data structure may also be used.

While the invention has been described with respect to a limited number of embodiments, those skilled in the art will appreciate that other embodiments can be devised which do not depart from the scope of the invention as disclosed herein. Accordingly, the scope of the invention should be limited only by the attached claims.

We claim:

1. A method for identifying an event of network activity associated with a network comprising a plurality of interfaces, the method comprising:
   providing a first data structure comprising a plurality of coordinate nodes for organizing measurements of the network activity, wherein the plurality of coordinate nodes form a lattice having a plurality of axes, wherein an axis of the plurality of axes comprises a plurality of coordinate units forming a hierarchical scale and corresponding to a plurality of hierarchical attributes of a hierarchy, wherein the plurality of hierarchical attributes represent hierarchical partitioning granularities configured to partition the network for measuring the network activity;
   using a processor of a computer, partitioning the plurality of interfaces into a plurality of groups based on a Cartesian product of a coordinate node of the plurality of coordinate nodes, wherein the Cartesian product of the coordinate node is based on at least one of the hierarchical partitioning granularities that is associated with the coordinate node;
   associating the plurality of groups with the coordinate node, wherein the plurality of groups form a measurement configuration of the network activity associated with the coordinate node;
   using the processor based on the measurement configuration of the network activity associated with the coordinate node, obtaining a series of measurements of the network activity relating to a group of the plurality of groups;
   representing the series of measurements of the network activity by a vector having a variable cardinality corresponding to a number of measurements in the series;
   adding the vector to a plurality of vectors in a lattice dictionary constructed based on the plurality of groups associated with the coordinate node;
   and
   identifying an event of the network activity based on the lattice dictionary.

2. The method of claim 1, further comprising:
   defining a super state of the network based on at least a first sub-vector of the vector; and
   calculating a distance of the first sub-vector to a second sub-vector of the vector, the second sub-vector being associated with a known event of the network activity,
   wherein identifying the event of the network activity comprises;
      comparing the distance to a threshold to generate a comparison based on a pre-determined criterion; and
      identifying the super state as the known event according to the comparison.

3. The method of claim 2, further comprising
   defining the known event based on historical measurements of the network activity;
   defining the hierarchical scale based on characteristics of the known event,
   wherein the hierarchical scale is a temporal scale and the plurality of hierarchical attributes of the hierarchy is a hierarchy of time intervals describing time partitioning granularities,
   wherein the coordinate node comprises a temporal scale unit associated with a time interval in the hierarchy of time intervals, and
   wherein the series of measurements of the network activity is a time series of measurements corresponding to a plurality of time points defined by the time interval associated with the temporal scale unit of the coordinate node, and
   wherein a portion of the time series of measurements is obtained by formatting the historical measurements of the network activity according to the measurement configuration of the network activity associated with the coordinate node.

4. The method of claim 3,
   wherein the super state of the network relates to a first time point of the plurality of time points, a leading element of the first sub-vector comprising a first measurement corresponding to the first time point in the time series of measurements,
   wherein the known event is defined based on the historical measurements of the network activity relating to a second time point of the plurality of time points, a leading element of the second sub-vector comprising a second measurement corresponding to the second time point in the portion of the time series of measurements,
   the method further comprising searching for the second sub-vector, to identify the super state, by traversing the first data structure.

5. The method of claim 1,
   wherein the hierarchical scale comprises at least one selected from the group consisting of a temporal scale comprising a hierarchy of time intervals, a topological scale comprising a hierarchy of topologies, and a categorical scale comprising a hierarchy of categories.

6. The method of claim 5,
   wherein the Cartesian product of the coordinate node is based on at least a second data structure representing the partitioning granularities associated with the plurality of coordinate units of the hierarchical scale and a third data structure representing another partitioning granularities associated with another plurality of coordinate units of another hierarchical scale associated with another axis of the plurality of axes.

7. The method of claim 6, wherein the second data structure is a hierarchical data structure comprising:
   fourth data structure corresponding to a first hierarchical attribute of the plurality of hierarchical attributes corresponding to the hierarchical scale, and
   a fifth data structure corresponding to a second hierarchical attribute of the plurality of hierarchical attributes corresponding to the hierarchical scale,
   wherein the fourth data structure comprises a name of the first hierarchical attribute and
   a pointer referencing the fifth data structure and
   wherein the second hierarchical attribute is a child attribute of the first hierarchical attribute in the hierarchy.

8. The method of claim 6,
   wherein the hierarchical scale comprises one of the topological scale and the categorical scale,
   wherein the plurality of hierarchical attributes corresponding to the topological scale comprise a first interface attribute, a router attribute, and a attribute with topological name "ALL", wherein the plurality of hierarchical attributes corresponding to the categorical scale comprise a second interface attribute, a link speed class attribute, and a attribute with categorical name "ALL", wherein the plurality of groups partitioned based on the Cartesian product of the coordinate node relate to at least one compounded partition granularity selected from a group consisting of "the first interface attribute, the router attribute", "the router attribute, the attribute with topological name "ALL"", "the second interface attribute, the link speed class attribute", and "the link speed class, the attribute with categorical name "ALL"", wherein the another hierarchical scale comprises the temporal scale, wherein the plurality of hierarchical attributes corresponding to the temporal scale comprise first and second time intervals, and wherein the series of measurements of the network activity is a time series of measurements based on the at least one compounded partition granularity and one of the first and second time intervals.

9. A computer readable medium, embodying instructions to perform method steps for identifying an event of network activity associated with a network comprising a plurality of interfaces, the instructions when executed by the computer comprising functionality to:

provide a first data structure comprising a plurality of coordinate nodes for organizing measurements of the network activity, wherein the plurality of coordinate nodes form a lattice having a plurality of axes, wherein an axis of the plurality of axes comprises a plurality of coordinate units forming a hierarchical scale and corresponding to a plurality of hierarchical attributes of a hierarchy, wherein the plurality of hierarchical attributes represent hierarchical partitioning granularities configured to partition the network for measuring the network activity;

using a processor of a computer, partition the plurality of interfaces into a plurality of groups based on a Cartesian product of a coordinate node of the plurality of coordinate nodes, wherein the Cartesian product of the coordinate node is based on at least one of the hierarchical partitioning granularities that is associated with the coordinate node;

associate the plurality of groups with the coordinate node, wherein the plurality of groups form a measurement configuration of the network activity associated with the coordinate node;

using the processor based on the measurement configuration of the network activity associated with the coordinate node, obtain a series of measurements of the network activity relating to a group of the plurality of groups;

represent the series of measurements of the network activity by a vector having a variable cardinality corresponding to a number of measurements in the series;

add the vector to a plurality of vectors in a lattice dictionary constructed based on the plurality of groups associated with the coordinate node; and identify an event of the network activity based on the lattice dictionary.

10. The computer readable medium of claim 9, wherein the instructions when executed by the computer further comprising functionality to:

define a super state of the network based on at least a first sub-vector of the vector; and calculate a distance of the first sub-vector to a second sub-vector of the vector, the second sub-vector being associated with a known event of the network activity, wherein identifying the event of the network activity comprises;
comparing the distance to a threshold to generate a comparison based on a pre-determined criterion; and
identifying the super state as the known event according to the comparison.

11. The computer readable medium of claim 10, wherein the instructions when executed by the computer further comprising functionality to:

define the known event based on historical measurements of the network activity;

define the hierarchical scale based on characteristics of the known event, wherein the hierarchical scale is a temporal scale and the plurality of hierarchical attributes of the hierarchy is a hierarchy of time intervals describing time partitioning granularities, wherein the coordinate node comprises a temporal scale unit associated with a time interval in the hierarchy of time intervals, and wherein the series of measurements of the network activity is a time series of measurements corresponding to a plurality of time points defined by the time interval associated with the temporal scale unit of the coordinate node, and wherein a portion of the time series of measurements is obtained by formatting the historical measurements of the network activity according to the measurement configuration of the network activity associated with the coordinate node.

12. The computer readable medium of claim 11, wherein the super state of the network relates to a first time point of the plurality of time points, a leading element of the first sub-vector comprising a first measurement corresponding to the first time point in the time series of measurements, wherein the known event is defined based on the historical measurements of the network activity relating to a second time point of the plurality of time points, a leading element of the second sub-vector comprising a second measurement corresponding to the second time point in the portion of the time series of measurements, wherein the instructions when executed by the computer further comprising functionality to search for the second sub-vector, to identify the super state, by traversing the first data structure.

13. The computer readable medium of claim 9, wherein the hierarchical scale comprises at least one selected from the group consisting of a temporal scale comprising a hierarchy of time intervals, a topological scale comprising a hierarchy of topologies, and a categorical scale comprising a hierarchy of categories.

14. The computer readable medium of claim 13, wherein the Cartesian product of the coordinate node is based on at least a second data structure representing the partitioning granularities associated with the plurality of coordinate units of the hierarchical scale and a third data structure representing another partitioning granularities associated with another plurality of coordinate units of another hierarchical scale associated with another axis of the plurality of axes.

15. The computer readable medium of claim 14, wherein the second data structure is a hierarchical data structure comprising:

a first hierarchical attribute of the plurality of hierarchical attributes corresponding to the hierarchical scale, and
a fifth data structure corresponding to a second hierarchical attribute of the plurality of hierarchical attributes corresponding to the hierarchical scale,
wherein the fourth data structure comprises a name of the first hierarchical attribute and
a pointer referencing the fifth data structure, and
wherein the second hierarchical attribute is a child attribute of the first hierarchical attribute in the hierarchy.

16. The computer readable medium of claim 14,
wherein the hierarchical scale comprises one of the topological scale and the categorical scale,
wherein the plurality of hierarchical attributes corresponding to the topological scale comprise a first interface attribute, a router attribute, and a attribute with topological name "ALL",
wherein the plurality of hierarchical attributes corresponding to the categorical scale comprise a second interface attribute, a link speed class attribute, and a attribute with categorical name "ALL",
wherein the plurality of groups partitioned based on the Cartesian product of the coordinate node relate to at least one compounded partition granularity selected from a group consisting of "the first interface attribute, the router attribute", "the router attribute, the attribute with topological name "ALL"", "the second interface attribute, the link speed class attribute", and "the link speed class, the attribute with categorical name "ALL"",
wherein the another hierarchical scale comprises the temporal scale,
wherein the plurality of hierarchical attributes corresponding to the temporal scale comprise first and second time intervals, and
wherein the series of measurements of the network activity is a time series of measurements based on the at least one compounded partition granularity and one of the first and second time intervals.

17. A system for identifying an event of network activity associated with a network comprising a plurality of interfaces, comprising:
a processor; and
memory storing instructions when executed by the processor comprising functionality to:
provide a first data structure comprising a plurality of coordinate nodes for organizing measurements of the network activity, wherein the plurality of coordinate nodes form a lattice having a plurality of axes, wherein an axis of the plurality of axes comprises a plurality of coordinate units forming a hierarchical scale and corresponding to a plurality of hierarchical attributes of a hierarchy, wherein the plurality of hierarchical attributes represent hierarchical partitioning granularities configured to partition the network for measuring the network activity;
using a processor of a computer, partition the plurality of interfaces into a plurality of groups based on a Cartesian product of a coordinate node of the plurality of coordinate nodes, wherein the Cartesian product of the coordinate node is based on at least one of the hierarchical partitioning granularities that is associated with the coordinate node;
associate the plurality of groups with the coordinate node, wherein the plurality of groups form a measurement configuration of the network activity associated with the coordinate node;
using the processor based on the measurement configuration of the network activity associated with the coordinate node, obtain a series of measurements of the network activity relating to a group of the plurality of groups;
represent the series of measurements of the network activity by a vector having a variable cardinality corresponding to a number of measurements in the series;
add the vector to a plurality of vectors in a lattice dictionary constructed based on the plurality of groups associated with the coordinate node; and
identify an event of the network activity based on the lattice dictionary.

18. The system of claim 17, wherein the instructions when executed by the processor further comprising functionality to:
define a super state of the network based on at least a first sub-vector of the vector; and
calculate a distance of the first sub-vector to a second sub-vector of the vector, the second sub-vector being associated with a known event of the network activity,
wherein identifying the event of the network activity comprises;
comparing the distance to a threshold to generate a comparison based on a pre-determined criterion; and
identifying the super state as the known event according to the comparison.

19. The system of claim 17, wherein the hierarchical scale comprises at least one selected from the group consisting of a temporal scale comprising a hierarchy of time intervals, a topological scale comprising a hierarchy of topologies, and a categorical scale comprising a hierarchy of categories.

20. The system of claim 18, wherein the instructions when executed by the processor further comprising functionality to:
define the known event based on historical measurements of the network activity;
define the hierarchical scale based on characteristics of the known event,
wherein the hierarchical scale is a temporal scale and the plurality of hierarchical attributes of the hierarchy is a hierarchy of time intervals describing time partitioning granularities,
wherein the coordinate node comprises a temporal scale unit associated with a time interval in the hierarchy of time intervals, and
wherein the series of measurements of the network activity is a time series of measurements corresponding to a plurality of time points defined by the time interval associated with the temporal scale unit of the coordinate node, and
wherein a portion of the time series of measurements is obtained by formatting the historical measurements of the network activity according to the measurement configuration of the network activity associated with the coordinate node.

21. The system of claim 20,
wherein the super state of the network relates to a first time point of the plurality of time points, a leading element of the first sub-vector comprising a first measurement corresponding to the first time point in the time series of measurements,
wherein the known event is defined based on the historical measurements of the network activity relating to a second time point of the plurality of time points, a leading element of the second sub-vector comprising a second measurement corresponding to the second time point in the portion of the time series of measurements, wherein the instructions when executed by the computer further comprising functionality to search for the second sub-vector, to identify the super state, by traversing the first data structure.

22. The system of claim 19, wherein the Cartesian product of the coordinate node is based on at least a second data structure representing the partitioning granularities associated with the plurality of coordinate units of the hierarchical scale and a third data structure representing another partitioning granularities associated with another plurality of coordinate units of another hierarchical scale associated with another axis of the plurality of axes.

23. The system of claim 22, wherein the second data structure is a hierarchical data structure comprising:
- a fourth data structure corresponding to a first hierarchical attribute of the plurality of hierarchical attributes corresponding to the hierarchical scale, and
- a fifth data structure corresponding to a second hierarchical attribute of the plurality of hierarchical attributes corresponding to the hierarchical scale,
- wherein the fourth data structure comprises a name of the first hierarchical attribute and a pointer referencing the fifth data structure, and
- wherein the second hierarchical attribute is a child attribute of the first hierarchical attribute in the hierarchy.

24. The system of claim 22,
- wherein the hierarchical scale comprises one of the topological scale and the categorical scale,
- wherein the plurality of hierarchical attributes corresponding to the topological scale comprise a first interface attribute, a router attribute, and a attribute with topological name "ALL",
- wherein the plurality of hierarchical attributes corresponding to the categorical scale comprise a second interface attribute, a link speed class attribute, and a attribute with categorical name "ALL",
- wherein the plurality of groups partitioned based on the Cartesian product of the coordinate node relate to at least one compounded partition granularity selected from a group consisting of "the first interface attribute, the router attribute", "the router attribute, the attribute with topological name "ALL"", "the second interface attribute, the link speed class attribute", and "the link speed class, the attribute with categorical name "ALL"",
- wherein the another hierarchical scale comprises the temporal scale,
- wherein the plurality of hierarchical attributes corresponding to the temporal scale comprise first and second time intervals, and
- wherein the series of measurements of the network activity is a time series of measurements based on the at least one compounded partition granularity and one of the first and second time intervals.

* * * * *